INVENTORS
CLARENCE K. SUZUKI
ROY H. HARADA
BY Robert G. Rogers
ATTORNEY

INVENTORS
CLARENCE K. SUZUKI
ROY H. HARADA
BY Robert G. Rogers
ATTORNEY

INVENTORS
CLARENCE K. SUZUKI
ROY H. HARADA
BY Robert G. Rogers
ATTORNEY

Aug. 4, 1970 C. K. SUZUKI ET AL 3,523,045

COHERENT RADIATION DEVICE

Filed Marc. 1, 1965 5 Sheets-Sheet 4

INVENTORS
CLARENCE K. SUZUKI
ROY H. HARADA
BY Robert G. Rogers
ATTORNEY

INVENTORS
CLARENCE K. SUZUKI
ROY H. HARADA

BY Robert G. Rogers

ATTORNEY

United States Patent Office 3,523,045

Patented Aug. 4, 1970

3,523,045
COHERENT RADIATION DEVICE

Clarence K. Suzuki and Roy H. Harada, Costa Mesa, Calif., assignors to North American Rockwell Corporation, a corporation of Delaware Filed Mar. 1, 1965, Ser. No. 436,066
Int. Cl. H01l 3/20, 3/22; H05b 33/00
U.S. Cl. 148—33.1 5 Claims

ABSTRACT OF THE DISCLOSURE

A gallium arsenide injection laser diode comprising a GaAs substrate doped with zinc and having a net acceptor impurity concentration of at least about $3\times10^{19}$ zinc atoms per cc. of substrate material, a tellurium doped gallium arsenide epitaxial layer disposed on the substrate, the layer forming a p-n junction having a donor impurity concentration and an acceptor impurity concentration of from about 1 to about $3\times10^{19}$ atoms per cc. of epitaxial layer.

This invention relates to a coherent radiation device and processes for producing it and more particularly to a GaAs injection laser diode and solution regrowth processes for producing epitaxial GaAs p-n junctions.

Forward biased GaAs p-n junction diodes when operated at low temperatures have been found to be highly efficient sources of recombination radiation. It has been suggested that this radiating characteristic is potentially useful as a means for pumping conventional lasers because of the increased efficiency which would result from their use. In diode laser devices the population inversion is established by applying to the laser material pump energy of a frequency closely corresponding to the separation between two energy levels; the resonance level of the excited atom to the terminal level. On conventional flash lamp pumping, the laser rod is pumped from about 30,000 cm.$^{-1}$ in the ultraviolet to beyond 10,000 cm.$^{-1}$ in the near infrared to provide the necessary energy to exceed the lasing threshold. This scheme, however, results in detrimental heating effects within the laser rod and is grossly inefficient compared to diode laser pumping. Further, to minimize pumping power requirements the diode laser pumping frequency is narrow and matches the absorption spectrum of the laser crystal such that maximum energy is utilized in inverting the electron population between two levels.

It is known that the 10,600 A. emitting $Nd^{+3}$ ion in $CaWO_4$ may be excited by the recombination radiation of a GaAs p-n junction (See J. of Appl. Phys., vol. 34, No. 2, Feb. 1963, pg. 437). The excitation of the 11,474 cm.$^{-14}$ $F_{3/2}$ level in $Nd^{+3}$ doped $CaWO_4$ with subsequent 10,600 A. laser emission to the $_4I_{11/2}$ level 2,000 cm.$^{-1}$ above ground state requires a GaAs injection laser pumping frequency (11,474 cm.$^{-1}$) having a wavelength of 8715 A. Stated differently, the $Nd^{+3}$ ion has several pumping or absorption bands, the lowest being at a wavelength of approximately 8700 A. If a junction laser is developed to pump the lowest band, more than 80% of the pump energy may be utilized for producing a laser radiation having a wavelength of 10,600 A. The usual prior art GaAs laser diodes, however, have spectral frequency outputs of near a wavelength of 8400 A. which do not match the $^4F_{3/2}$ absorption of $Nd^{+3}$ doped hosts. As a result, little of the 8400 A. laser diode pumping energy is useful for pumping the band at 8715 A. In conventional flash lamp excitation of $Nd^{+3}$ doped host crystals, adverse heating effects accompany the ultraviolet and visible absorption in these crystals and result in a decrease in efficiency of converting pumping energy into laser energy.

A junction laser which pumps only the 8715 A. band of $Nd^{+3}$ doped hosts may be used in high repetition rate scanning laser radar, laser burst communicators, and other devices because the 1.06$\mu$ radiation is regulated by controlling the GaAs injection laser output of 8715 A. by relatively simple electrical inputs (no flash lamps into the diodes. This scheme necessarily requires a number of 8715 A. laser diodes such that the laser threshold of the $Nd^{+3}$ doped host is exceeded by the sum of the energies of all the diodes.

Briefly, the process of applicant's invention comprises the steps of placing a gallium arsenide substrate doped with zinc and having a preselected impurity acceptor concentration together with a solution consisting essentially of tin, tellurium and polycrystalline gallium arsenide, having a preselected impurity donor concentration, in a controlled, heated environment. The substrate and the solution are selectively heated to slightly different temperatures. In the process, the solution and substrate are heated to a temperature higher than the immersion temperature to insure complete solution saturation at the immersion temperature. The substrate is immersed in the solution and the temperature is reduced by controlled increments to achieve an epitaxial growth of gallium arsenide doped with tellurium and tin on the substrate.

In certain prior art processes, the substrate is immersed in the solution after both have been heated but before temperature equilibrium has been attained. Since the solution heats up at a different rate than the substrate, if time is not allowed for thermal equilibrium the solution may be cooler than the substrate, or vice versa.

After the epitaxial growth has been achieved, the acceptor impurity in the substrate is then interdiffused into the epitaxial layer to change the impurity concentration of a portion of the epitaxial layer thereby forming a p-n junction having a desired donor and acceptor concentration for emitting predominantly radiation of a preselected frequency. Between the junction and the substrate, the acceptor atoms of the substrate are present in greater concentration than the acceptor atoms of the epitaxial layer. At the junction, the acceptor concentration equals the donor impurity concentration. Between the junction and the epitaxial growth surface not in contact with the substrate, the concentration of the donor atoms is greatest.

After the interdiffusion to form the p-n junction, the GaAs wafer is cleaned and processed into diodes by conventional techniques.

The resulting diode comprises a GaAs diode appropriately modified with respect to doping levels on either side of a p-n junction. The diode of the preferred embodiment comprises GaAs substrate doped with zinc and an epitaxial layer of Te, Zn and Sn deposited on the substrate which, after interdiffusion, has a p-n junction in which the donor and acceptor concentrations are at least about $1\times10^{19}$ atoms per cc. of epitaxial material.

It is the principal object of this invention to provide a semiconductor device having a plurality of dopants, the concentration and distribution of which are closely controlled to provide a device particularly adapted for use as a laser diode for pumping $Nd^{+3}$ doped host crystals.

It is another object of the present invention to provide a coherent radiation device and process for producing it having a controlled recombination radiation spectrum particularly adapted to emit radiation at a frequency of 11,474 cm.$^{-1}$ corresponding to a wavelength of 8715 A.

It is a further object of this invention to provide a coherent radiation device having a relatively high radiation output at 8715 A. or thereabouts.

A still further object of this invention is to provide a semiconductor device and method for fabricating it in which the dopant concentration and distribution are controlled to provide coherent radiation particularly suitable for pumping an $Nd^{+3}$ doped $CaWO_4$ crystal or other $Nd^{+3}$ doped hosts such as yttrium aluminum garnet (YAG).

A still further object of the invention is to provide a process for fabricating GaAs laser diodes by which the concentration and distribution of a plurality of dopants are closely controlled to provide a coherent radiation source having a predominate portion of the emission spectra at about 8715 A.

These and other objects and features of the invention will become apparent in the following invention description and drawings in which.

Figure 1:
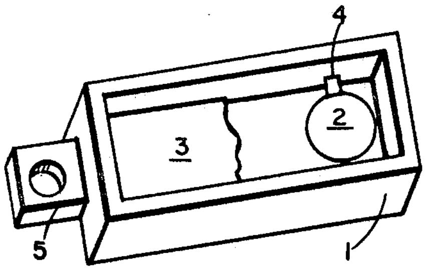
FIG. 1 is an illustration of a container used in the process for producing a laser diode.

Referring now to FIG. 1, the apparatus for carrying out the process of the present invention is illustrated, and comprises container 1 suitably proportioned for enclosing substrate 2 and a tin solution 3. The container is preferably graphite material but may be fabricated from other materials which are non-reactive to the tin solution 3 and which will withstand the temperatures utilized. Although in the embodiment shown only one substrate 2 is illustrated in container 1, the container may be suitably proportioned to hold several substrates and a sufficient quantity of solution 3 to satisfy the requirements for growing epitaxial layers on the substrates 2.

In addition to the container, holding element 4, such as a graphite wedge or similar material, is utilized in the container to hold the substrate 2 in place during subsequent processing steps. The container may include a handle portion 5, such as a protruding section of material similar to the container, at one end of the container for selectively manipulating the container. For example, a quartz rod may be inserted into the aperture for pushing and pulling the container.

Figure 2:
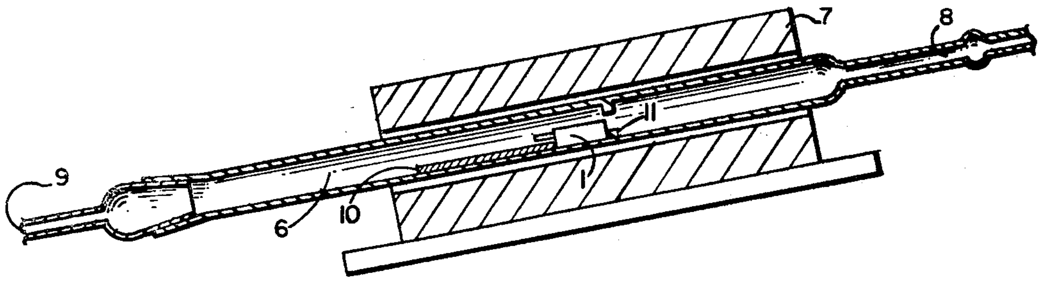
FIG. 2 is a schematic representation of apparatus used in producing an epitaxial layer on a substrate.

FIG. 2 illustrates the container in a tube prior to initiating the process. Tube means 6, which constitutes an enclosure for container 1, may be of quartz or similar temperature resistance material. The tube 6, at least at one circumferential area thereof, is enclosed by furnace means 7 for heating container 1, substrate 2 and solution 3 which are positioned therein. The furnace is preferably a wire wound, tilt type, well-known in the art. The temperature is controlled by controlling current flow and control means and a current source (not shown) are well-known in the art.

The tube means 6 for housing the container 1 is designed to provide for the injection of gases into tube 6 through inlet 8. Outlet means 9 is also provided for passage of gases and other elements from tube 6. The container 1 is prevented from sliding longitudinally within tube 6 by anchor plate 10 and protruding member 11.

The apparatus required for the interdiffusing step of the process of the present invention is well-known in the art and is therefore not described herein.

The initial steps of the process of the invention are carried out utilizing the above-described apparatus by performing certain operational steps on and with the substrate 2 and solution 3. The substrate is GaAs doped to $3\times10^{19}$ A./cc. of zinc. The solution 3 is comprised of materials with less than one-thousandth of a percent of impurities other than Sn and Te.

While the substrate is immersed in the solution as described hereinafter in detail, a small amount of zinc doped gallium arsenide substrate is dissolved by the solution. During the subsequent cooling cycle, as the temperature is reduced the major constituent of the solution, gallium arsenide, precipitates out of the solution doped with varying amounts of the preselected dopants, tellurium, tin, as well as zinc liberated from the substrate. The amount of each dopant in the regrown gallium arsenide epitaxial layer is a complex function of the exponential dependence of solubility and of the $T^{-1}$ dependence of segregation coefficient with temperature.

Table 1 shows the solubility of gallium arsenide and tin as a function of the three indicated temperatures.

TABLE I.—SOLUBILITY OF GALLIUM ARSENIDE IN TIN AS A FUNCTION OF TEMPERATURE

| | Mole Fraction Arsenic | Solubility of Gallium Arsenide in 8 grams of Tin |
|---|---|---|
| Temperature, ° C.: | | |
| 740 | $7\times10^{-2}$ | 0.7 |
| 630 | $3\times10^{-2}$ | 0.3 |
| 475 | $5\times10^{-3}$ | 0.05 |

With a solution of 8 grams of tin, 0.6 gram of gallium arsenide and 40 milligrams of tellurium, only approximately one-half of the 0.6 gram of gallium arsenide is in the tin solution at the equilibrium temperature of 630° C. At the end of the cooling cycle, 475° C., the solubility of gallium arsenide is further reduced to 0.05 gram which indicates that 0.25 gram of gallium arsenide precipitates out of the solution during the cooling cycle.

It is known in the art that the solubility of one constituent in another constituent depends on the temperature of the solution and on the ratio of the quantities of the constituents. Accordingly, if the quantity of the constituents is changed, it may be necessary to change the temperature to insure the desired precipitation. Therefore, a different cooling cycle and gram ratio of solution constituents may be utilized as is well-known in the art.

As noted above, zinc is present in the epitaxial layer because a small amount of the substrate surface dissolves upon being immersed in the tin solution. A ten micron layer of substrate material, using the ¾ inch diameter substrate having a zinc impurity concentration of $3\times10^{19}$ atoms per cc. produces approximately $4.5\times10^{16}$ atoms of zinc in the tin solution. The expected segregation coefficient at 630° C. is approximately $3\times10^{-3}$ and approximately an order of magnitude lower at 475° C. For the purpose of this description, a mean value of segregation coefficient, K., of approximately $3\times10^{-3}$ is assumed. Using this value of K. and a calculated volume of $7.46\times10^{-3}$ cubic centimeters for the epitaxial layer, a doping level of $1.8\times10^{16}$ zinc atoms per cc. of the epitaxial layer is calculated. Such a zinc dopant concentration in the epitaxial layer is negligible when compared with other doping impurity concentrations to materially effect the electrical characteristics.

It is assumed that tellurium has a solubility of $3\times10^{-3}$ mole fraction in the tin solution at 630° C. and $5\times10^{-4}$ mole fraction in the tin solution at 475° C. These solubilities are considered reasonable since tellurium has a covalent radii larger than gallium and arsenic. As a result, approximately .26 milligrams of tellurium is in solution with 8 grams of tin at 630° C. and approximately 4 milligrams of tellurium is in solution at 475° C. The difference of 22 milligrams precipitates out of the solution during the cooling cycle. A segregation coefficient, K., approximately equal to that for zinc is assumed because of the small, 3 percent, difference in the covalent radii between zinc and tellurium. On this basis the weight of tellurium in the epitaxial layer would be about $6.6\times10^{-2}$ milligrams which corresponds to a concen- of about $3.1\times10^{17}$ atoms of tellurium.

Further calculations using the volume for the layer will show that with the above assumptions and calculations there are approximately $4 \times 10^{19}$ tellurium atoms per cubic centimeter of gallium arsenide in the epitaxial layer. It can similarly be shown that the tin concentration in the gallium arsenide epitaxial layer is approximately $2 \times 10^{18}$ atoms of tin per cubic centimeter of gallium arsenide. In most cases that concentration of tin may be neglected when compared with the concentration of tellurium.

The data set forth in Table II shows the effects of interdiffusion time and the concentration gradient obtained from capacitance measurements of a few typical diodes on the laser emission wavelength.

Since the donor concentration in the epitaxial layer is not homogeneously distributed throughout the thickness due to the nature of the growth process, it is difficult to determine the concentration at the junction after the interdiffusion treatment. The epitaxy in Example I was grown without any tellurium and the laser emission and concentration gradient of this diode show that the donor concentration is less than the other examples and that the concentration at the junction is less than $10^{19}$ per cubic centimeter. Examples 3(*a*) and 3(*b*) show that the time of interdiffusion has an effect on the laser emission wavelength but that the concentration gradient changes very little or none at all. Examples 2 and 3(b) are the ones which emit near 8700 A., as shown. As mentioned above, the concentration at the junction is difficult to determine. However, a range of concentration which presumably would emit at 8700 A. can be determined. First of all for the present case the upper limit should be less than $3 \times 10^{19}$ since this is the Zn concentration in the substrate and this cannot be exceeded. The lower concentration limit can be estimated from the data of M. I. Nathan et al., Phys. Rev., 132, 1482 (1963). They measured the emission from GaAs diodes at 77° K. near the absorption edge, i.e., the lasing line, as a function of carrier concentration. Also, the peak of the p-type (Zn doped) photoluminescence as a function of acceptor concentration was measured. The highest donor concentration used was about $1.7 \times 10^{18}$ cm.$^{-3}$. Assuming that the effective mass of electrons remains constant at these doping levels, the diode edge emission curve was extrapolated parallel to the Zn photoluminescence curve to the point corresponding to 8700 A. This results in a carrier concentration of about $1.2 \times 10^{19}$ cm.$^{-3}$. Therefore, a concentration at the junction (where Nd=Na) of from about 1 to less than $3 \times 10^{19}$ atoms per cubic centimeter appear to be necessary for the laser emission near 8700 A.

TABLE II.—THE EFFECT OF INTERDIFFUSION AND CONCENTRATION GRADIENT IN EPITAXIAL LAYER ON LASER EMISSION WAVELENGTH

| Ex. | Interdiffusion Time at 944° C. in Hours | Zn Concentration of Substrate $\times 10^{19}$, cm.$^{-3}$ | Concentration Gradient $\times 10^{23}$, cm.$^{-4}$ | Laser Wavelength at 77° K., A. |
|---|---|---|---|---|
| 1 | 3 | 1 | 1.3 | 8,450 |
| 2 | 3 | 3 | 5.5 | 8,700 |
| 3(a) | 3 | 3 | 5.2 | 8,660 |
| 3(b) | 4 | 3 | 5.1 | 8,720 |

Figure 3:
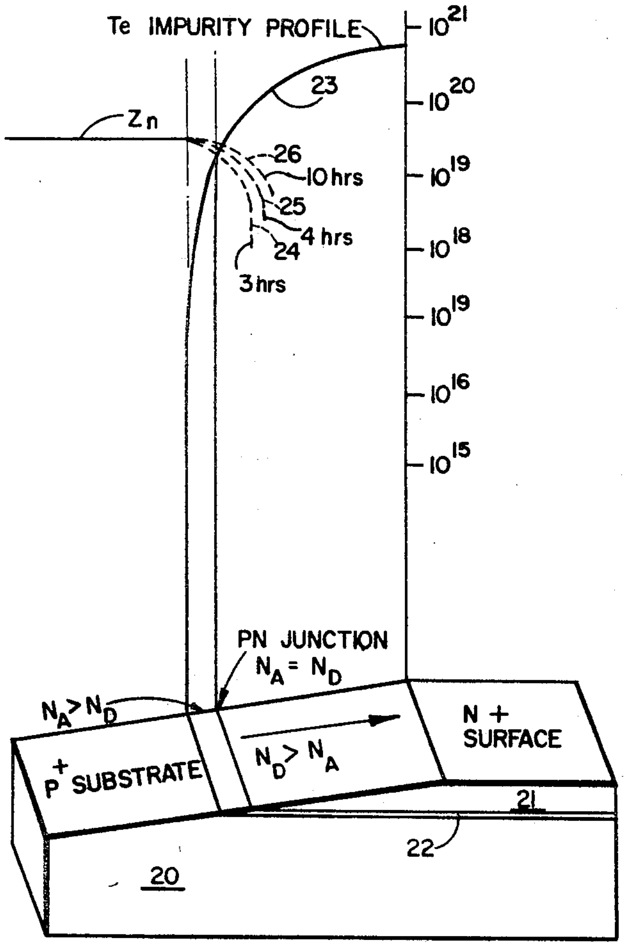
FIG. 3 is an illustration of the concentration profiles of an epitaxial layer.

A cutaway view of a device is shown in FIG. 3 to more easily illustrate the theoretical impurity distribution profile of the substrate and epitaxial layer after interdiffusion.

The substrate 20 is shown as having a thickness of approximately .008 inch and the epitaxial layer 21 is shown as having a thickness of approximately 0.002 inch. The p-n junction 22, after interdiffusion, is shown as being approximately 0.0001 inch from the as grown junction between the substrate and the epitaxial layer. Obviously the distance of the p-n junction from the as grown junction may vary depending on the process embodiment used.

The tellurium impurity concentration of the epitaxial layer increases with distance from the substrate surface and is estimated to be greater than $10^{20}$ atoms per cc. at its surface. This concentration profile increase with distance from the substrate surface is illustrated by curve 23.

During interdiffusion, the zinc atoms diffuse into the epitaxial layer and form a p-n junction having a position determined by the point at which the zinc concentration gradient (see curves 24–26) intersects the tellurium concentration gradient (curve 23). The actual point of intersection and, therefore, the p-n junction level depends on the time, temperature of interdiffusion as well as the Zn concentration of substrate and the Te concentration of the epitaxy. For example, if an interdiffusion time of 4 hours at 944° C., curve 25, is used with the substrate described herein, the p-n junction is estimated to occur where the tellurium and zinc concentrations are approximately $2 \times 10^{19}$ atoms per cc. At that concentration, electrical energy through the junction produces light between about 8500 A. and 8750 A. at 77° K. with the predominate portion between 8600 and 8750 A. It is also apparent from curves 24 and 26, for 3 hour and 10 hour interdiffusion time, respectively, that the p-n junction level is dependent upon interdiffusion time.

The interdiffusion at 944° C. require approximately 3 to 4 hours and results in the diodes becoming extremely electroluminescent with sharp forward characteristics when electrical energy is passed through the junction. The change of concentration and doping level occurs because zinc from the substrate diffuses through the expitaxial gallium arsenide with the tellurium concentration gradient. The diffusion profile of typical zinc diffusion is somewhat altered by the presence of the tellurium concentration gradient. For example, the diffusing zinc will encounter an increasing tellurium concentration with distance so that deep penetration of zinc into the expitaxial layer becomes difficult and is retarded.

The laser emission from many of the diodes after interdiffusion is approximately 8700 A. at 77° K. From Table II it is apparent that a donor level of from about 1 to about $3 \times 10^{19}$ atoms per cc. of epitaxial layer is necessary for 8700 A. emission using approximately 3 to 4 hour hour interdiffusion at 944° C. The 8700 A. gallium arsenide laser described herein has threshold current densities of typically less than 2,000 amps./cm.$^2$ with light power and energy output of the same order of magnitude as an ordinary 8400 A. laser may produce.

The following examples illustrate the various parameters of and modifications to the process of the present inventions and demonstrates the applicability of the method in carrying out the above stated objects.

EXAMPLE I

A zinc doped gallium arsenide substrate having an acceptor-donor impurity difference of $3 \times 10^{19}$ atoms per cc. of zinc is polished, cleaned, etched and placed at one end of a 2¼ inch long by 1¼ inch wide and ¾ inch high graphite container. The substrate is wedged in one end of the graphite container by means of a small graphite wedge inserted between one edge of the wafer and one wall of the container as shown in FIG. 1. The substrate is 8 mils thick and approximately ¾ in diameter with (100) orientations.

A tin solution comprised of 8 grams of 99.999% pure tin, 0.6 gram of n-type polycrystalline gallium arsenide ($N_d - N_a \simeq 10^{16}$ atoms per cc., and 40 milligrams of 99.999% pure tellurium (about 0.5 wt. percent), is placed at the other end of the graphite container as shown in FIG. 1.

The container is then placed inside a quartz tube which is inserted into a resistance furnace as illustrated in FIG. 2.

Nitrogen is injected into the tube via a passageway at one end thereof to flush air out the tube. Subsequently, hydrogen is injected into the system at a flow rate of about 0.5 liters per minute.

Power is supplied to the furnace to heat the substrate to a temperature of approximately 740° C. After 740° C. has been achieved, the power is turned off until the substrate cools to 630° C. At that time power is reapplied to the furnace to maintain the temperature of the substrate at approximaely 630° C. for approximately 18 minutes. The temperature gradient along the graphite container inside the furnace is such that, when the substrate is at 630° C., the tin solution is at a temperature of 620° C.

The furnace assembly, including the quartz tube, is tilted so that the tin solution flows over the gallium arsenide wafer. The substrate wafer is maintained in the immersed condition for 2 minutes at a temperature slightly less than 630° C.

Figure 4:
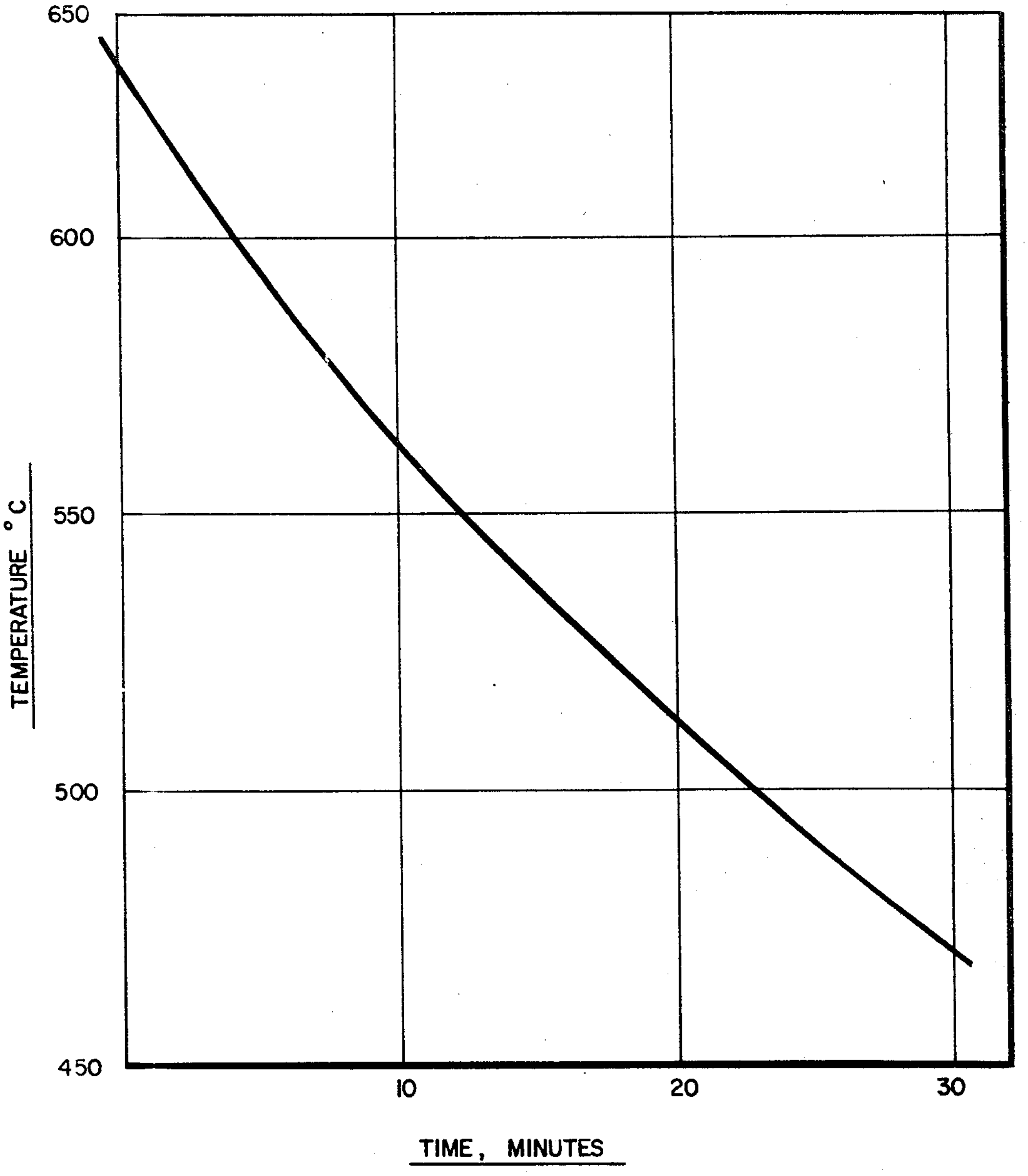
FIG. 4 is a chart showing a typical cooling curve for the substrate and solution during production of the laser device.

The temperature is then reduced at a rate of 7° C. per minute for 4 minutes, gradually changing to 4° C. per minute at the end of a period of 30 minutes. A typical cooling curve, shown in FIG. 4, illustrates the rate of reduction in temperatures over a selected interval to achieve epitaxial growth.

The furnace assembly is then tilted back to the start position and the ambient in the tube is changed back to nitrogen. The substrate is removed and the excess tin solution is removed from the substrate. An epitaxial layer of approximately two mils is deposited on a substrate having a ¾ inch diameter. The donor concentration at the surface of the epitaxial growth was estimated to be approximately $10^{20}$ atoms per cc.

The gallium arsenide substrate is next placed in a quartz tube of small volume, approximately 2 cc., under an argon ambient at a pressure of 0.5 atmosphere. The substrate is interdiffused for 3 hours at 944° C., to form a p-n junction of desired impurity concentration. The impurity concentration of the junction is estimated to have an acceptor concentration of slightly less than $3\times10^{19}$ Zn atoms per cc. of GaAs and a donor concentration of slightly less than $3\times10^{19}$ Te atoms per cc. of GaAs so that the difference, $N_A-N_D$, is approximately zero. The junction is located at approximately 0.0001 inch from the initial substrate surface.

The substrate is then cleaved along <110> planes and processed into diodes by affixing suitable electrodes to appropriate portions thereof. Final dimensions for the diodes were typically 45 x 15 x 10 mils thick.

The current versus voltage characteristics of the diode were measured and found to be similar to a regular GaAs diode. A forward bias of from 1 to 1.2 volts was obtained at 100 milliamps of current. The diodes were found to be strongly electroluminescent when viewed with an infrared image converter. Capacitance measurements indicated an impurity concentration gradient of about $5\times10^{23}$ cm.$^{-4}$ at the p-n junction. The highest concentration gradient reported by prior art (G. C. Dousmanis, et al., App. Phys. Letters, 3, 133 (1963) is $1.4\times10^{23}$ cm.$^{-4}$.

Figure 5:
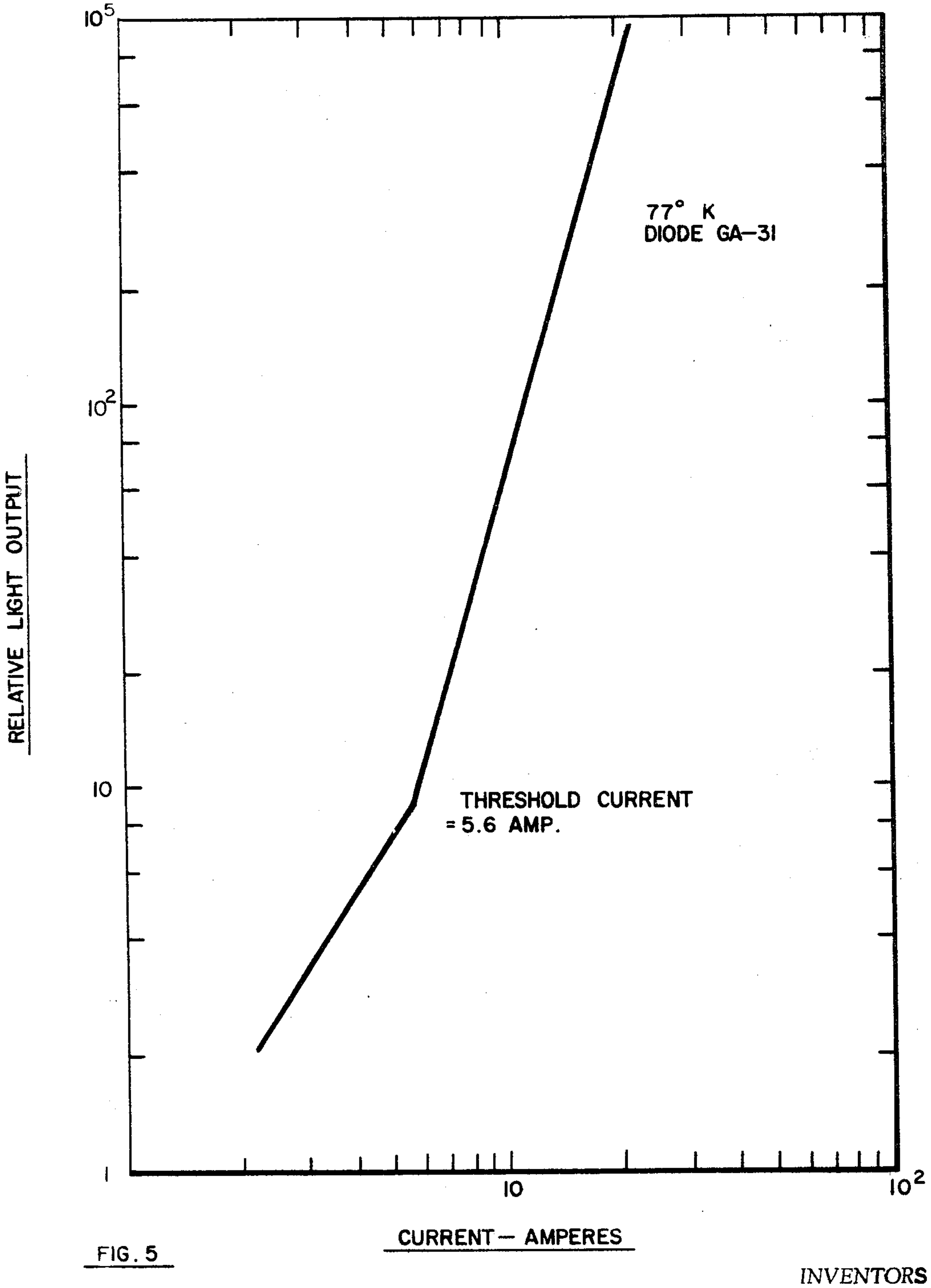
FIG. 5 is a graph of light intensity emitted by the device versus current through the diode.

The diode was also tested for its light intensity versus input current. The tests were conducted under pulse conditions at 77° K., utilizing one microsecond pulse at a repetition rate of 11 p.p.s. As shown in FIG. 5, the light increases rapidly in the lasing region. For the diode tested, the threshold current density was 1200 amp/cm.$^2$.

Figure 6A:
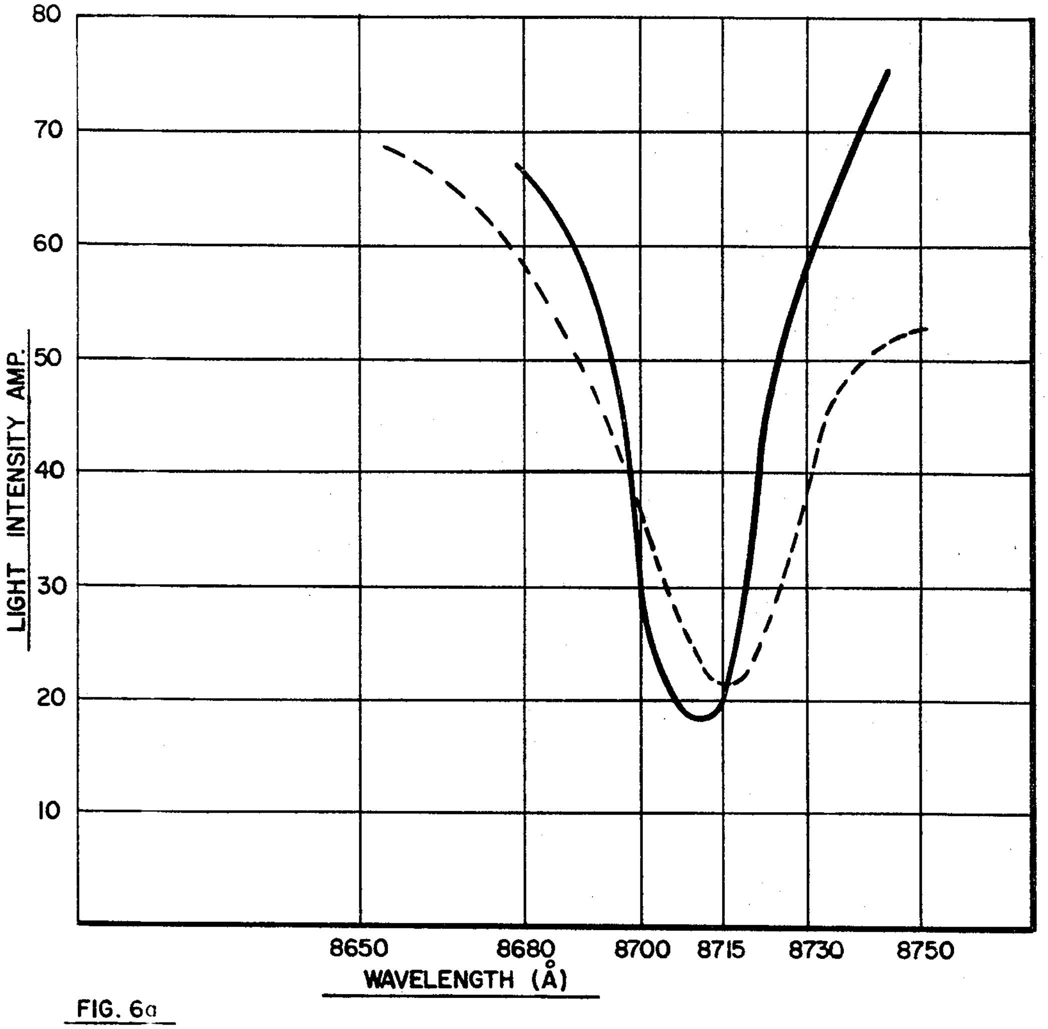
FIG. 6 is a chart showing typical spectrum of an 8715 A. radiating diode above threshold which is tuned to the absorption spectrum of $Nd^{+3}$ doped $CaWO_4$.
Figure 6B:
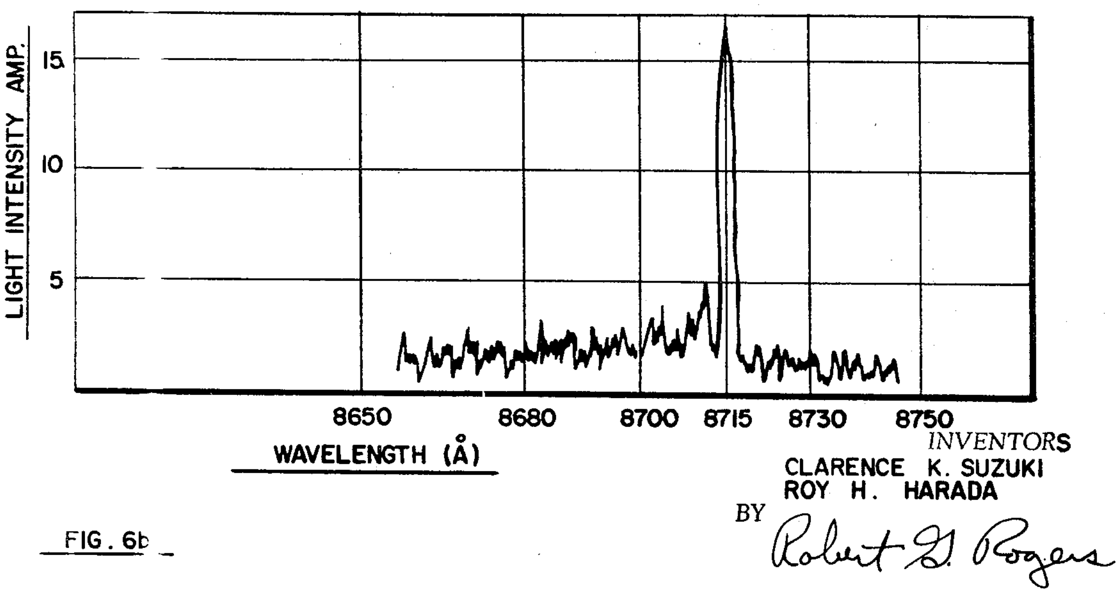

The emission spectrum of typical diodes produced in accordance with the process described in Example I is shown in FIG. 6. The laser emission spectrum (see FIG. 6*b*) showed a principle Fabry-Perot mode at 8715 A. and corresponds to the 8715 A. absorption band of $CaWO_4:Nd^{+3}$ at 77° K. The envelope of the total spectrum was about 3 A. in width with the center located at 8716 A. FIG. 6*a* shows the absorption spectra of $CaWA_4:Nd^{+3}$ at room temperature and at 77° K. It is apparent that the laser diode emission matches into the absorption of $Nd^{+3}$ at the temperatures indicated. Although not obviously apparent, the 77° K. absorption of $Nd^{+3}$ is much more narrow than for 300° K.

EXAMPLE II

The steps and conditions of Example I were repeated using substrates having (110) orientations cleaved along a <100> plane resulting in a diode having an epitaxial growth of one mil deposited on the substrate, and a donor concentration of the epitaxial layer of approximately $10^{20}$ atoms per cc. No substantial change in operational characteristics of the diode was detected.

EXAMPLE III

The steps and conditions of Example I were repeated using substrates having (111) orientations cleaved along a <110> plane. No substantial change in operational characteristics of the diodes was detected.

EXAMPLE IV

The steps and conditions of Example I were repeated except that the cooling rate was changed. The effect of reducing the cooling rate is to slow down the rate of growth of the GaAs on the substrate. The growth rate corresponding to the 7° C. per minute cooling rate averaged over 30 minutes is approximately 2 mils or 1.65 $\mu$/min. The reduction of the cooling rate to 1° C./min. results in a much longer time being required to produce approximately 2 mils of epitaxial growth, e.g., about 3.5 hours. However, the nature of the epitaxial growth is improved under the slower growth conditions.

A cooling rate of 15° C./min. will result in a 2 mil epitaxial growth in about 15 minutes. However, under these fast growth conditions polycrystalline growth is more likely.

The cooling rate should, therefore, not exceed about 10° C./min. in order to insure complete single crystal growth. Further, cooling rates less than 7° C./min. for the first five minutes show no detrimental effects.

In the process of the present invention, the laser emission wavelength is a function of the Zn concentration in the substrate and the Te concentration in the solution grown GaAs. An important feature of this process is that the necessary amount of Te is incorporated into the epitaxial grown GaAs by the judicious control of the temperature during cooling, i.e., about 7° C. per minute in the preferred embodiment for the first 5 minutes of growth. Preferably the amount of Te in the Sn solution is very close to 0.5 wt. percent. However, amounts from about 0.5 to less than about 0.75 of one wt. percent may be used with consequent shifts in the lasing wavelength. Beyond 0.75 of one wt. percent, the growth becomes polycrystalline.

Where lasing wavelengths beyond 8800 A. are desired, a Zn doped substrate having a net acceptor impurity concentration higher than $3\times10^{19}$ atoms per cc., e.g., $10^{20}$ atoms per cc., could be utilized. The effect of this higher doping is to provide a larger concentration of diffusant for diffusing into the GaAs epitaxy during the interdiffusing step. For example, with a Te concentration profile as shown in FIG. 3, the Zn diffuses at 944° C. or higher, and the point of crossover to the Te concentration profile to form the p-n junction would occur beyond the $5\times10^{19}$ atoms per cc. point. Thus, by the proper selection of the Zn doping level in the GaAs substrate and the judicious control of the epitaxial growth process to incorporate Te into the epitaxial growth layer without alloy formation or polycrystalline growth, the laser wavelength output may be selectively controlled.

Since the 11,474 cm.$^{-1}$ absorption band of $Nd^{+3}$ doped $CaWO_4$ is approximately 250 A. wide and the laser radiation of the diodes of the present invention, shown in FIG. 6, is centered at 8716 A. with a full width at half maximum of about 3 A., the laser emission from the diode has the capability for pumping a $Nd^{+3}$ laser rod.

Figure 7:
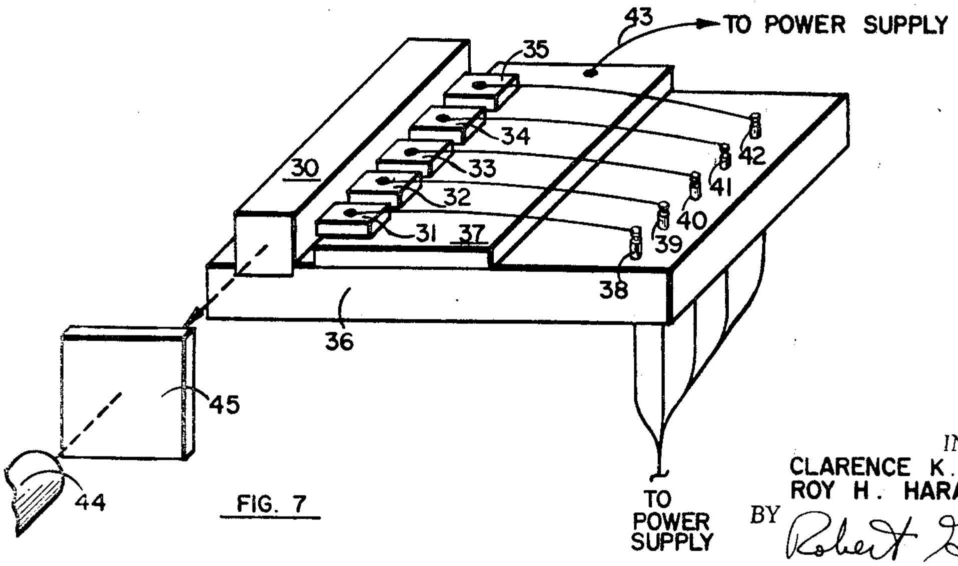
FIG. 7 is an illustration of laser diodes connected and arranged for pumping a laser rod.

In order to test diodes fabricated in accordance with the present invention for their effectiveness in pumping a laser rod, the system shown in FIG. 7 was utilized.

The system utilized a laser rod 30 comprised of $CaWO_4:Nd^{+3}$ having dimensions of 1/16 x 1/16 x ½ inch, one end of which was coated with silver for 100% reflectance. Five diodes, 31 through 35, emitting radiation at about 8715 A., were placed in contact with one side surface of the rod 30 in a position for directing light energy into the rod. The laser rod was placed on an insulation mount 36 of Mylar and the diodes were placed on a copper sheet 37. The system was maintained at a temperature of 77° K. by conventional techniques.

The diodes were energized with power from a power supply (not shown) via electrodes 38, 39, 40, 41, and 42, and lead 43 connected to a copper sheet 37. Photo tube detector 44 was placed in front of the transmitting end of the laser rod 30 for determining the frequency of light emitted from the laser. Filter 45, e.g. silicon, was position between the detector 44 and the rod 30 to eliminate .8715$\mu$ pump light produced by the diodes. The filter was selected for passing only 1.06$\mu$ light.

Twenty-four amperes were passed through each diode creating a voltage drop of 1.5 volts and a power input of 180 watts. The diodes had an approximate efficiency of 10 percent in converting electrical energy into light energy. Since only one end of the diode was being used, the efficiency at that end was 5 percent. As a result, the useful power at 5 percent efficiency was reduced to 9 watts for the conditions described above, which was further reduced to 4.5 watts by an approximate 50 percent coupling efficiency between the diode laser radiation and the rod (assumed). The pulse length was 100$\mu$ seconds so that the total energy absorbed by the $Nd^{+3}$ was $4.5\times10^{-4}$ Joules. This amount of energy was chosen so as to be above the calculated laser threshold for $CaWO_4$:$Nd^{+3}$ rod by a factor of 2.

The energy which impinged upon detector 44 was conducted to an oscilloscope (not shown) in order to observe the 1.06$\mu$ radiation. It was seen that the rod was emitting light at 1.06$\mu$.

It should be understood that the invention is intended to cover all changes and modifications of the examples of the process herein described and of the device produced by the processes herein described in the specification which do not constitute departure from the spirit and scope of the invention.

We claim:

1. In combination a GaAs substrate doped with zinc and having a net acceptor impurity concentration of at least about $3\times10^{19}$ Zn atoms per cc. of substrate material, an epitaxial layer on said substrate of GaAs doped with tellurium, a p-n junction formed in said epitaxial layer, said p-n- junction having a donor impurity concentration and acceptor impurity concentration of at least greater than $1\times10^{19}$ but less than $3\times10^{19}$ atoms per cc. of epitaxial layer.

2. In combination a GaAs substrate doped with zinc and having a net acceptor impurity concentration of from about $3\times10^{19}$ to about $1\times10^{20}$ atoms per cc. of substrate material, an epitaxial layer on said substrate of gallium arsenide doped with tellurium, said layer forming a p-n-junction, said p-n- junction having a donor impurity concentration and an acceptor impurity concentration of from about 1 to about $3\times10^{19}$ atoms per cc. of epitaxial layer.

3. The combination as recited in claim 2 wherein said donor impurity concentration at said junction is greater than $1\times10^{19}$ but less than $3\times10^{19}$ atoms per cc. of said epitaxial layer.

4. An 8700 angstrom laser device comprised of a gallium arsenide substrate doped with zinc and having a net acceptor impurity concentration of at least about 1 to $3\times10^{19}$ atoms per cc. of substrate material, an epitaxial layer of GaAs doped with tellurium on one surface of said substrate, said layer having a donor impurity concentration and an acceptor impurity concentration which are approximately equal thereby forming a p-n junction within said layer, said p-n junction having a concentration gradient of about $5\times10^{23}/cm.^4$.

5. The combination as recited in claim 1 wherein said epitaxial layer further is doped with tin.

References Cited

UNITED STATES PATENTS

| | | | |
|---|---|---|---|
| 3,197,411 | 7/1965 | Frosch | 148—176 X |
| 3,293,513 | 12/1966 | Biard et al. | 313—237 |
| 3,341,787 | 9/1967 | Biard et al. | 331—94.5 |

L. DEWAYNE RUTLEDGE, Primary Examiner

R. A. LESTER, Assistant Examiner

U.S. Cl. X.R.

148—33, 33.4; 313—108; 317—234, 237; 331—94.5